_United States Patent Office_

3,687,640
Patented Aug. 29, 1972

3,687,640
AGGLOMERATING ALKALI METAL SILICATE BY TUMBLING AND ROLLING WHILE HEATING AND COOLING
Robert H. Sams, Aldan, Robert W. Linton, Springfield, and Helmut H. Weldes, Havertown, Pa., assignors to Philadelphia Quartz Company, Philadelphia, Pa.
No Drawing. Filed Jan. 18, 1971, Ser. No. 107,444
Int. Cl. B01j 2/00, 2/12; C01b 33/32
U.S. Cl. 23—313                    7 Claims

ABSTRACT OF THE DISCLOSURE

Hydrated, soluble alkali metal silicate particles are agglomerated by tumbling during the introduction of limited additional moisture and/or heat, forming granules of desired larger size and having preferred density, dissolving, strength, and free-flowing characteristics for uses such as in detergent formulations.

INTRODUCTION

The usefulness of soluble alkali metal silicates usually depends on their physical as well as chemical characteristics. Frequently a granular form is preferred to a solution or a fine powder, but usually with requirements that the granular product be free-flowing, sufficiently durable to minimize dusting or caking during storage and handling and readily water-soluble. Granular products also have advantages over powders when used in blended products or blending processes, in that, they do not contribute to dusting and caking, and they do not segregate from the blend.

Granular, readily soluble alkali metal silicates other than spray dried and crystallized materials have generally been unavailable as commercial products. The crystalline silicates, for example anhydrous sodium metasilicate, sodium metasilicate pentahydrate or sodium sesquisilicate are quite useful with desirable particle sizes and bulk densities but their low silica:alkali ratio makes them unnecessarily caustic for many applications. More siliceous silicates can be prepared by spray drying to a residual moisture level that will retain the desired solution rate. However, the spray dried materials have disadvantages; the particles produced are quite small. Generally, if the density is useful for blending the particles are too small for such a use. If the preparation of larger particles is attempted these are apt to be fragile microballoons of very low bulk density which are unsuitable for bulk storage, shipping and numerous uses.

We have found a method to produce hydrated alkali metal silicate granules which can be varied as desired, to provide granules in preferred ranges of particle size bulk density and physical strength while possessing the free-flowing character and solution rate necessary for many applications. The process is essentially a tumbling operation, in which relatively dense but very fine hydrated alkali metal silicate particles collide and roll over one another, while the careful warming of the tumbling mass encourages agglomeration. In another embodiment of the invention the tumbling particles are subjected to steam or moisture addition which may be accompanied with or followed by heating to achieve the agglomeration. As tumbling continues after the moisture addition or heating, the recently formed agglomerates become moisture equilibrated, mutually non-adherent particles. The process can be manipulated to produce high yields of product in desired particle size ranges for example the 10 to 65 mesh size range at controlled bulk densities in the range of 20 to 65 lbs./cu. ft. Products can be produced in the 10 to 65 mesh size range that have bulk densities of 20 to 30 lbs./cu. ft., 30 to 37 lbs./cu. ft. or 45 to 65 lbs./cu. ft. The resulting granular alkali metal silicates are useful in many applications particularly in detergents.

It is an object of this invention to convert very fine particles of hydrated alkali metal silicate to larger more useful particle sizes with varying bulk densities. The fine particles can be relatively dense or light. It is a further object of this invention to provide suitable alkali metal silicate products for use in detergent compositions.

THE INVENTION

The starting material may be obtained by spray drying, fluidized bed drying, or thin film drying of sodium and/or potassium silicate solutions. We prefer to use spray dried material, because the spray drying operation, sometimes to its own disadvantage, is especially suited for producing large quantities of relatively fine but fairly dense hydrated silicate particles. Particle size distribution in the starting mixture can vary considerably, but the majority of particles obviously need to be substantially smaller than the average granule size desired of the agglomerated product. However, the initial particle size is of some importance in the process; the particle size of the agglomerated product is roughly proportional to the initial particle size of the starting material. Therefore, if the initial particle size is large the resulting agglomerates will be large. For this reason we prefer to use particles that have a size distribution such that 80% or more of the particles pass through 65 mesh screening. Size distributions of this type can lead to larger yields of desired particle size range by further manipulation of the other process variables. There is some tolerance for a few oversized particles in the starting mixture, because the moistening or warming which promotes agglomeration also encourages the compacting of porous particles, particularly when the agglomeration is arranged to produce a relatively dense product.

The $SiO_2/M_2O$ mole ratio of the initial particle mixture can vary from 1.4:1 to 5.0:1; M stands for an alkali metal or a mixture of alkali metals. The starting mixture can consist of sodium silicate particles, potassium silicate particles, sodium silicate and potassium silicate particles, or particles of sodium-potassium double silicate. The ratio of $SiO_2/M_2O$ has an effect on the agglomeration; silicates with low ratios are somewhat easier to agglomerate than silicates with high ratios. We have found that it is easier to control the yield of agglomerates, in any desired particle size range, if the alkali metal silicate particles have mole ratios of $SiO_2/M_2O$ of 1.6:1 to 4.0:1.

The moisture content of the starting particle mixture can vary from 10 to 30% and additional water may be introduced during the agglomeration. We have found the moisture content of the particles has an important influence on the particle size of the agglomerated product. The particle size of products agglomerated under the same conditions is proportional to the moisture content of the initial particle mixture. Therefore, granular products realized from particle mixtures with high water contents (about 22% or more) might be quite coarse, 10 mesh or larger if the conditions during the agglomeration are not carefully controlled by methods delineated later in this application, while under some conditions, it might be somewhat easier to control the particle size and realize a larger yield of the desired particle size fraction by agglomerating particle mixtures with somewhat lower moisture contents; products with high moisture contents exhibit fast dissolving characteristics that are particularly desirable for some applications.

The particle mixture is tumbled during warming and/or the addition of moisture to achieve a desired degree of agglomeration. Here, tumbling means keeping the mixture in motion, but without interfering with or forcing contact among the particles, and serves several functions in the agglomeration. It serves to distribute heat and/or moisture throughout the mixture, and causes repeated collision and rolling among the particles so that, as their surfaces develop an adherent character, they stick together and the clusters shape into individual granules having survival strength. Continued tumbling permits remaining fine particles to cement onto the granule surfaces and if desired it allows the granules to become more rounded and compacted by continued rolling among other granules, and finally it keeps the granules freely in motion until they have lost any adherent character either by recooling or by surface moisture dissipation.

Tumbling of the desired nature may be accomplished with a revolving drum, pan, sphere, or tube. Using heat to affect agglomeration within a closed system, for instance, a metal or plastic drum can be partially filled with a hydrated silicate particle mixture, closed, and rotated horizontally while being heated externally with burners, warm air, or heat lamps along its length or in a trough of warming water, then air- or water-cooled as rotating continues. Lifts can be attached to the interior drum wall to facilitate tumbling, and the drum can be designed to eliminate interior corners, or provided with knockers, to minimize or free material lodging where it could consolidate as chunks rather than free-flowing granules.

For an open or continuous system of similar nature, using heat to bring about agglomeration, slightly inclined pipe, either rotating and preferably with lifts to assist tumbling or non-rotating but with an internal screw turning slowly to lift, tumble, and convey the material through warming, shaping, and recooling zones can achieve the desired result.

Heat is applied to the particles indirectly through the walls of the container which can be heated by any convenient manner, with the tumbling action serving to distribute the heat throughout the particle mix. The rate and extent of heating is most critical in agglomerating the material determining the yield and the bulk density of the useful particles. It is important to heat the material slowly and uniformly to prevent lumps, localized overdrying, and coating of the container wall which would in turn prevent efficient heat transfer to the particles. The temperature to which the particle mass is heated influences both the particle size and the bulk density of the product. The particle size and bulk density developed are proportional to the temperature to which the particle mass is heated. The following table illustrates these relationships for sodium silicate particles with a weight ratio of 2.4 $SiO_2/Na_2O$, a moisture content of 23.3% and a particle size such that 80% of the particles pass through a 65 mesh screen. In these agglomerating runs several heating rate schedules were used and in some runs the maximum temperature was maintained for a short time, but in other runs the particles were allowed to begin recooling as soon as the maximum temperature was reached.

| Run No. | Heating rate (° C./min.) | | | Time at max. temp. (min.) | Percent product coarser than 65 mesh | Tamped bulk density |
|---|---|---|---|---|---|---|
| | 60° C. | 80° C. | 100° C. | | | |
| 1 | 3 | [1]2 | | 0 | 75 | 24 |
| 2 | 1 | [1]1 | | 0 | 74 | 26 |
| 3 | 3 | 2 | | 0 | 80 | 25 |
| 4 | 1 | 1 | | 0 | 87 | 30 |
| 5 | 3 | 2 | 2 | 0 | 90 | 35 |
| 6 | 3 | 1 | 1 | 0 | 84 | 43 |
| 7 | 3 | 1 | 1 | 20 | 81 | 52 |
| 8 | 3 | 1 | [2]1 | [3]20 | 99 | 66 |

[1] 75° C.
[2] To 105° C.
[3] At 105° C.

The rotation rate of the agglomerating drum is also important in determining the particle size of the product granules. Control of the rotation rate can be effectively used to control the growth of oversize particles and to increase the yield of particles in the useful particle size ranges. During the heating cycle the rotation rate should be controlled such that the particles collide with enough frequency to allow quick particle growth. During the cooling cycle it is sometimes advantageous to increase the rotation rate about 10 to 25% to make the tumbling action more violent and prevent further particle growth.

Additional moisture may be incorporated in the hydrated silicate particle mixture for heat agglomeration, usually to achieve larger or less dense granules or unusually rapid product solubility, or in dealing with overly dried particles. The moisture can be introduced as vapor from steam jets, or as water or a silicate solution from a fine sprayer, sparger pipes, or an intensifier bar, and distributed throughout the tumbling mixture before heating begins.

Where moisture addition is itself the agglomerating mechanism, the preceding applies as to water vapor or liquid or a silicate solution being used and the choice in manner of introduction. To affect uniform, coordinated agglomeration throughout a particle mixture rather than simply disperse some added moisture, however, requires more cautious introduction of the moisture, and, as in critical stages of heat agglomerating, continuous movement of the dampening, re-stabilizing material. This can be accomplished by moisture addition to a cascading bed of particle mixture in a rotating drum or pipe, by spraying onto a raked bed of the mixture in a tilted, revolving pan granulator, or a spray mixer. The better choice depends on handling characteristics of the material being agglomerated, production rate desired, and on the size, general shape, and density hence the strength of product granules desired. Alkali metal silicate solution as the moisture additive can contribute to granule strength, as does continued tumbling following moisture addition to granule stability, particularly if some warming can then be provided to assist moisture equilibration.

The granular hydrated alkali metal silicate products made according to our invention can be varied considerably with respect to desirable ranges of particle size and bulk density. On a commercial scale, the product as discharged from the rotary agglomerator will usually consist of a few very coarse granules, some very fine particles and the majority of the granules in useful particle such as 10 to 65 mesh, 10 to 70 mesh, 10 to 48 mesh or 20 to 48 mesh. The small oversize fraction can be crushed to the desired particle size or to fines which can be recycled along with the fine particles. The tamped bulk densities of these products can vary from 20 to 65 lbs./cu. ft. However, we can conveniently prepare products in the 10 to 65 mesh size range with tamped bulk densities in the ranges of 20 to 30 lbs./cu. ft., 30 to 37 lbs./cu. ft., or 45 to 65 lbs./cu. ft. The products are free-flowing, non-dusting, and non-caking indicating the water contained by the particles is well equilibrated. The moisture content of the granules can be varied from 10 to 30%. The product dissolves rapidly, the products with 20% or more water dissolve most rapidly. The insoluble material in these products is quite low, in many cases it is somewhat lower than the insoluble level of the starting materials.

These granular products are useful in detergent mixtures, in which they can be blended with other granular and optionally, smaller amounts of liquid ingredients to furnish non-caking, non-segregating detergent formulations. These products are particularly useful in dry blended detergents in which phosphates have been replaced with other chelating agents. In these formulations the silicate serves a number of functions. It is a detergent builder, corrosion control agent and it can be hydrated, carrying water that the phosphate would normally carry. This water is necessary for proper mix conditioning and dissolving characteristics. The products can also serve as post-blend carriers for detergent additives, such as enzymes, or as carriers for dyes to produce "specks." These hydrated silicate products are also useful in detergent formulations containing minimal water to be spray dried. The readily water soluble character of these products makes them useful in numerous applications in solution such as water treatment, corrosion prevention, brick manufatcure, buffering and deflocculating but where a more handable solid would be an advantage.

EXAMPLES

A better understanding of the invention can be obtained from the following illustrative examples which should not be considered restrictive.

Example 1

An agglomerator consisting of a closed steel drum 2 feet in diameter by 3 feet in length, equipped with lifters which provide cascading, tumbling and rolling when drum is rotated, was charged with 40 lbs. of sodium silicate particles. The drum was heated with gas burners on the sides and at the ends. The sodium silicate particles had the following properties: $SiO_2/Na_2O$ wt. ratio 2.4 (2.47 mole ratio); 19.8% moisture; 0.04% insoluble as determined by dissolving the powder at room temperature; and the particle size distribution was such that 86% of the particles passed through a 65 mesh screen. The agglomerator was rotated at 40 r.p.m. and heated at a rate of 3° C./min. to 60° C. and heating continued to 80° C. at 1° C./min. Upon reaching 80° C. the speed of rotation was decreased to 16 r.p.m. and the agglomerator was allowed to recool. The cooled product was discharged from the drum and screened; 87% of the material was larger than 65 mesh; only 13% of the material had remained unagglomerated. The material larger than 65 mesh consisted of 70% in the 10 to 65 mesh size and 17% larger than 10 mesh. The tamped bulk density of the product was 32 lbs./cu. ft. The tamped bulk density is measured by weighing a sample, then compacting the sample by tapping it on a hard surface until the volume does not change and measuring the volume. The moisture content was 19.7% and the particle dissolved rapidly with only 0.04% insoluble.

Example 2

The agglomerator of Example 1 was used in several agglomerating runs to investigate the effect of particle size on the granule size of the product. The particles used were the same as in Example 1 except for the particle size. The heating rates, temperaturees and charge were the same as in Example 1. The following table summarizes the results.

| Run Number | Raw material, percent passed through 65 mesh | Product, percent larger than 65 mesh | Percent 10 to 65 mesh |
| --- | --- | --- | --- |
| 1 | 50 | 95 | 38 |
| 2 | 60 | 92 | 43 |
| 3 | 70 | 89 | 57 |
| 4 | 80 | 87 | 85 |
| 5 | 90 | 70 | 67 |
| 6 | 100 | 50 | 43 |
| 7 | ¹ 80 | 37 | 33 |

¹ Through 100 mesh.

Example 3

The agglomerator of Example 1 was used in several agglomerating runs to investigate the effect of the $SiO_2/Na_2O$ ratio on the particle size of the product. The heating rates, temperature and charge were the same as in Example 1. The particle size of the sodium silicate was such that 85% of the particles passed through 65 mesh screening and the moisture content was 18%. The following table summarizes the results.

| Run Number | Ratio $SiO_2/Na_2O$ Weight | Ratio $SiO_2/Na_2O$ Mole | Product percent larger than 65 mesh | Percent 10 to 65 mesh |
| --- | --- | --- | --- | --- |
| 1 | 1.6 | 1.65 | 92 | 84 |
| 2 | 2.0 | 2.06 | 87 | 85 |
| 3 | 2.4 | 2.47 | 89 | 87 |
| 4 | 3.2 | 3.30 | 80 | 77 |
| 5 | 3.8 | 3.92 | 67 | 63 |

Example 4

The agglomerator of Example 1 was used in several agglomerating runs to investigate the effect of the moisture content of the fine particles to be agglomerated on the particle size of the product. The particle size and ratio of the sodium silicate and the amount charged into the agglomerator were the same as described in Example 1. In this set of runs the agglomerator was heated at 3° C./min. to 60° C. and at 1° C./min. to 100° C. The results are summarized in the following table

| Run Number | Moisture content, fines percent | Percent product larger than 65 mesh | Percent product in 10 to 65 mesh range |
| --- | --- | --- | --- |
| 1 | 19.8 | 83 | 66 |
| 2 | 22.7 | 89 | 52 |
| 3 | 24.2 | 93 | 47 |
| 4 | 26.3 | 99 | 45 |

Example 5

The agglomerator of Example 1 was used for several agglomerating runs to investigate the effect of the rotation rate of the agglomerator on the particle size of the granular product. The fine particles were the same as in Example 1 and the heating rates and temperatures were the same as in Example 4. The results of these runs are summarized in the following table.

| Run Number | Rotation rate (r.p.m.) Heating cycle | Rotation rate (r.p.m.) Cooling cycle | Product, percent larger than 65 mesh | Percent in 10 to 65 mesh |
| --- | --- | --- | --- | --- |
| 1 | 40 | 16 | 97 | 30 |
| 2 | 40 | 40 | 95 | 45 |
| 3 | 40 | 50 | 94 | 60 |
| 4 | 40 | 55 | 95 | 52 |

Example 6

A mixture of spray dried hydrated sodium silicate particles was prepared having a water content of 20.2%. The particles had an $SiO_2/Na_2O$ wt. ratio of 2.0 and a size distribution such that 85% of the particles passed through 65 mesh screening. The tamped bulk density of the fine particles was 55 lbs./cu. ft. The agglomerator of Example 1 was charged with 40 lbs. of the particles and rotated at 40 r.p.m. The agglomerator was heated at 6° C./min. to 60° C., 2° C./min. to 80° C. and 1° C./min. to 100° C. After reaching 100° C. the rotation was increased to 50 r.p.m. and the material allowed to cool. The product consisted of 63% in the 10 to 65 mesh size range, 28% finer than 65 mesh and 9% larger than 10 mesh. The moisture content was 20.1% and the granules dissolved rapidly, only 0.21% remained undissolved when 5 g. of the product was dissolved in 95 g. of water at 75° F. for 5 minutes. The tamped bulk density was 43 lbs./cu. ft.

Example 7

The agglomerator of Example 1 was charged with 40 lbs. of hydrated sodium silicate particles prepared by spray drying and having a water content of 19.8%. The particles had an $SiO_2/Na_2O$ wt. ratio of 2.4 and a size distribution such that 85% of the particles passed through 65 mesh screening. The tamped bulk density of the fine particles was 33 lbs./cu. ft. The agglomerator was rotated at 40 r.p.m. and heated at 3° C./min. to 60° C., 2° C./min. to 80° C. and 1° C./min. to 100° C. After reaching 100° C. the rotation was increased to 50 r.p.m. and the product allowed to cool. The product consisted of 50% in the 10 to 65 mesh size range, 14% finer than 65 mesh and 36% larger than 10 mesh. The moisture content was 19.7% and the granules dissolved rapidly, only 0.18% remained undissolved in 95 g. of water at 75° F. for 5 minutes. The tamped bulk density was 50 lbs./cu. ft.

Example 8

A mixture of particles that had a combined $SiO_2/Na_2O$ wt. ratio of 2.6 was placed in the agglomerator of Example 1. The hydrated particle bed had been prepared by fluid bed drying sodium silicate solutions with $SiO_2/Na_2O$ ratios of 3.2 and 2.0. The proportions of the particles of each ratio were such that the effective ratio of the mixture was 2.6. The fine particles were obtained from several different runs but the combination was such that 80% of the particles passed through 65 mesh screening. The moisture content was 20%. The agglomerator was rotated at 30 r.p.m. and heated at 3° C./min. to 60° C., and at 1° C./min. to 100° C. The temperature was maintained at 100° C. for 5 minutes then the rotation rate was increased to 50 r.p.m. while the product recooled. The resulting product was screened and 80% of the granules were in the 10 to 65 mesh fraction, 15% were larger than 10 mesh and only 5% were finer than 65 mesh. The bulk density of the 10 to 65 mesh fraction was 55 lbs./cu. ft. The moisture content was 19.8% and the granules dissolved very rapidly with only 0.31% insoluble when 5 g. of the material was dissolved in 95 g. of water at 75° F. for 5 minutes.

Example 9

A mass of hydrated potassium silicate particles prepared by thin film drying were placed in the agglomerator of Example 1. The potassium silicate particles had an $SiO_2/K_2O$ wt. ratio of 2.5 (3.92 on a mole basis), a moisture content of 15% and a particle size such that 83% passed through 65 mesh screening. The agglomerator was rotated at 40 r.p.m. and heated at 3° C./min. to 60° C. and 1° C./min. to 100° C. The rotation was increased to 60 r.p.m. while the product was cooled by forcing cool air through the drum. The screened product consisted of 83%, 10 to 65 mesh particles, 10% larger than 10 mesh and 7% finer than 65 mesh. The bulk density was 37 lbs./cu. ft. for the 10 to 65 mesh fraction. The moisture content was 14.7 and the granules dissolved rapidly in water.

Example 10

A mixture consisting of the fine sodium silicate particles of Example 6 and the fine potassium silicate particles of Example 9 was prepared. The $SiO_2/Na_2O+K_2O$ ratio of the mixture on a mole basis was 3.0 and the moisture content was 18.6. The agglomerator was charged with 40 lbs. of the mixture and rotated at 40 r.p.m. The heating rate was 3° C./min. to 60° C. and 2° C./min. to 80° C. Then the rotation rate was increased to 55 r.p.m. and the product allowed to cool. The product was screened and found to consist of 63% 10 to 65 mesh particles, 10% larger than 10 mesh and 27% smaller than 65 mesh. All three fractions had the same analysis. The water content was 18.6% and the particles dissolved rapidly. The bulk density of the 10 to 65 mesh fraction was 30 lbs./cu. ft.

Example 11

A mixture of spray dried hydrated sodium silicate particles was prepared having an overall weight ratio of 2.0 $SiO_2/Na_2O$ and an 18.4% water content. The particle size of the mixture was such that 85% of the material passed through 100 mesh screening and 91% passed through 70 mesh screening. This mixture was tumbled in a rotating container while steam was seeped into the open end. Steam introduction was slow enough and of such limited duration that no temperature increase could be measured. Rotating was continued for 5 minutes after steam addition was halted. The resulting material was screened, providing 65.4% of 20 to 70 mesh product (5.4% was coarser, 29.2 finer). The 20 to 70 mesh product had a tamped bulk density of 31 lbs./cu. ft., 19.2% moisture, free-flowing and non-caking character unlike the initial spray dried powder. It exhibited as rapid and complete dissolving as the original finer powder in a test involving the agitation of a 10% particles-90% water slurry at 75°F. for up to 5 minutes.

Example 12

A cylindrical container, having tubular lifts attached to its inner wall, was partly filled with about ⅓ its volume of spray dried hydrated silicate particles. The particle mixture had a 2.4 $SiO_2/Na_2O$ weight ratio, 20.3% moisture content, 38 pounds bulk density, and consisted of 76% finer than 70 mesh particles. The cylinder was closed and rotated horizontally while heat lamps warmed its interior steadily to 100° C. during a 22 minute interval, then for a 15 minute recooling interval. A window in the container permitted observation that the initially loose particle mixture became decidedly clinging and nondistinct as its temperature reached 60°, became distinctly granular in character as the temperature neared 90°, but would then block to form a large grainy cake if rotation were stopped. Material after the 15 minute recooling interval was screened, providing 94% of a desired 12 to 70 mesh product with a bulk density of 30 lbs./cu. ft. (1% was coarser but easily granulated, and 5% finer). 59% was within a 12 to 20 mesh size range, and this narrow, major fraction had a bulk density of 23 lbs./cu. ft.

A repeat of the preceding work, except that the rotating cylinder of mixture on reaching 100° C. was maintained at that temperature for an hour before recooling proceeded, produced 98% of desired 12 to 70 mesh product with a bulk density of 40 lbs./cu. ft. 78% was within the narrow 12 to 20 mesh size range, and this had a bulk density of 38 lbs./cu. ft., 19.3% moisture content, and was more highly soluble (99.92% vs. 99.84%) than the original powder mixture when 5% particles/95% water slurries at 75° F. were agitated 5 minutes and filtered.

Example 13

A laundry detergent of the following composition was prepared using the product of Example 6.

|  | P.b.w. |
|---|---|
| Ultrawet (anionic surfactant; Atlantic Chem. Co.) | 20 |
| Sodium tripolyphosphate | 45 |
| $Na_2CO_3$ | 24 |
| Hydrated silicate of Example 6 | 5 |
| Sodium carboxymethyl cellulose | 1 |
| Blancophor RG (optical brightener; GAF Corp) | 0.1 |
| Water | 5 |

The ingredients were mixed in a crutcher as a 60% solids slurry and spray dried. After spray drying perfumes and other minor ingredients were added. The product was an effective laundering compound.

Example 14

A dry blended laundry detergent of the following composition was prepared using the product of Example 7.

|  | P.b.w. |
|---|---|
| Triton X–100 (nonionic surfactant; Rohm & Haas Corp) | 12 |
| Sodium nitrilotriacetic acid monohydrate | 30 |
| Hydrated silicate of Example 7 | 36 |
| $Na_2CO_3$ | 21 |
| Na CMC | 1 |
| Blancophor RG (optical brightener; GAF Corp) | 0.1 |
| Water | 7 |

The mix was an excellent detergent in which the silicate did not contribute to caking or to any other condition that would indicate the lack of equilibrium in moisture content. Also the silicate did not segregate out of the mix.

Example 15

An automatic home dishwashing detergent of low phosphate content was prepared using the product of Example 7.

| | P.b.w. |
|---|---|
| Sodium tripolyphosphate | 33.0 |
| Hydrated silicate of Example 7 | 54.8 |
| Sodium nitrilotriacetic acid | 5.5 |
| Triton CF–54 (nonionic surfactant; Rohn & Haas Corp) | 2.0 |
| CDB–60 (solid bleach, FMC Corp) | 1.7 |
| Water | 3.0 |

This detergent was effective in cleaning dishes and did not attack the overglaze of fine china. This mixture did not develop insolubles that might be expected from the amount of silicate added.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What we claim is:

1. A process for producing readily water soluble alkali metal silicate granules comprising a plurality of small hydrated alkali silicate particles bonded together at touching surfaces comprising the steps of gently tumbling and rolling a mass of small hydrated alkali metal silicate particles having a particle size distribution such that 65 to 90% of the particles pass through 65 mesh screening while heating the small particles of alkali metal silicate at 0.5 to 6° C. per minute to a temperature between 60 and 105° C., and then cooling the particles while continuing the tumbling and rolling.

2. The process of claim 1 in which the tumbling and rolling is more vigorous during the cooling step.

3. The process of claim 1 in which the small particles of alkali metal silicate are heated at 0.5 to 6° C./minute to a temperature between 65 to 85° C.

4. The process of claim 1 in which the small particles of alkali metal silicate are heated at 0.5 to 6° C./minute to 90 to 105° C.

5. The process of claim 1 in which the small particles of alkali metal silicate are heated at 0.5 to 6° C./minute to 95 to 100° C. and then maintained at that temperaure for 5 to 30 minutes.

6. The process of claim 1 in which the mass of small hydrated alkali metal silicate particles are gently tumbled and rolled and treated with steam.

7. The process of claim 1 in which the mass of small hydrated alkali metal silicate is gently tumbled and rolled while being sprayed with a liquid selected from the group consisting of water and an alkali metal silicate solution.

References Cited

UNITED STATES PATENTS

| 3,538,212 | 11/1970 | Beau | 264—117 |
| 3,411,888 | 11/1968 | Westerland | 23—313 |
| 3,231,413 | 1/1966 | Berquin | 23—313 |
| 3,537,815 | 11/1970 | Burke | 23—110 |
| 3,287,281 | 11/1966 | Haden | 23—313 |
| 3,323,876 | 6/1967 | Arey | 23—313 |
| 3,532,473 | 10/1970 | Biegler | 23—313 |
| 3,222,129 | 12/1969 | Osment | 23—313 |
| 3,471,253 | 10/1969 | Shaver | 23—110 |

FOREIGN PATENTS

| 558,625 | 6/1958 | Canada | 264—117 |
| 565,877 | 4/1958 | Belgium | 264—117 |

NORMAN YUDKOFF, Primary Examiner

S. J. EMERY, Assistant Examiner

U.S. Cl. X.R.

23—110 A; 264—117; 252—135